United States Patent [19]

Hofmann et al.

[11] Patent Number: 5,677,529
[45] Date of Patent: Oct. 14, 1997

[54] PASSIVE INFRARED SENSOR USING A PAIR OF SENSORS AND REFLECTORS FOR A 270 DEGREE FIELD OF VIEW

[75] Inventors: Günter Hofmann; Manfred Zimmerhackl; Volkmar Norkus, all of Dresden; Jens-Olaf Lang, Cossebaude; Rainer Rosch, Lüdenscheid; Lothar Blomberg, Neuenrade, all of Germany

[73] Assignee: ABB Patent GmbH, Mannheim, Germany

[21] Appl. No.: 335,546

[22] Filed: Nov. 7, 1994

[30] Foreign Application Priority Data

Nov. 6, 1993 [DE] Germany ............... 43 37 953.2

[51] Int. Cl.$^6$ ............... G01V 9/04; G01J 5/08
[52] U.S. Cl. ............... 250/221; 250/239; 250/353
[58] Field of Search ............... 250/221, 222.1, 250/239, 342, 353, 203.1; 340/555, 556, 557, 565

[56] References Cited

U.S. PATENT DOCUMENTS

| 4,081,680 | 3/1978 | Keller | 250/342 |
|---|---|---|---|
| 4,644,147 | 2/1987 | Zublin | 250/221 |
| 4,876,445 | 10/1989 | McMaster | |
| 5,107,120 | 4/1992 | Tom | 250/352 |
| 5,266,807 | 11/1993 | Neiger | 250/353 |
| 5,308,985 | 5/1994 | Lee | 250/353 |
| 5,317,620 | 5/1994 | Smith | 379/40 |
| 5,393,978 | 2/1995 | Schwarz | 250/353 |
| 5,406,083 | 4/1995 | Sandell et al. | 250/353 |
| 5,414,255 | 5/1995 | Hampson | 250/221 |

FOREIGN PATENT DOCUMENTS

| 0 113 468 | 7/1984 | European Pat. Off. . |
|---|---|---|
| 0 326 942 | 8/1989 | European Pat. Off. . |
| 0 435 120 | 7/1991 | European Pat. Off. . |
| 0 623 905 | 11/1994 | European Pat. Off. . |
| 85 25 061.9 | 4/1987 | Germany . |
| 38 12 969 | 11/1989 | Germany . |
| 89 10 920.1 | 12/1989 | Germany . |
| 39 32 943 | 4/1991 | Germany . |
| 41 00 536 | 7/1992 | Germany . |

*Primary Examiner*—Stephone Allen
*Attorney, Agent, or Firm*—Herbert L. Lerner; Laurence A. Greenberg

[57] ABSTRACT

A device for receiving light beams, especially a PIR movement detector, includes a housing having at least one window in which lens segments, preferably Fresnel lenses, are disposed in such a way that horizontally incident light beams are focused as direct horizontal beams onto two light sensors. The two light sensors are mutually disposed in such a way that a usable sensor detection angle of the two light sensors is defined. In order to achieve an enlargement of the detection angle, at least one horizontal reflector is disposed in the vicinity of at least one of the light sensors, in such a way that the horizontal reflector detects further light beams from a horizontal angular region not covered by the light sensors with the usable detection angle, and these beams reach at least one of the light sensors as reflected horizontal beams. The lens segments surround the light sensors having the at least one horizontal reflector in a curve-shape to such an extent that they also focus horizontal beams which are incident outside the usable sensor detection angle.

13 Claims, 2 Drawing Sheets

PASSIVE INFRARED SENSOR USING A PAIR OF SENSORS AND REFLECTORS FOR A 270 DEGREE FIELD OF VIEW

BACKGROUND OF THE INVENTION

Field of the Invention

The invention relates to a device for receiving light beams, especially a PIR (Passive Infrared) movement detector, including a housing having at least one window in which lens segments, preferably Fresnel lenses, are disposed in such a way that horizontally incident light beams are focused as direct horizontal beams onto two light sensors, and the two light sensors are mutually disposed in such a way that a usable sensor detection angle of the two light sensors is defined or obtained.

Such devices are used as PIR movement detectors for automatically switching-on interior lighting and in conjunction with alarm and monitoring systems in room monitoring. The magnitude of the detection angle of the device is of decisive importance, especially in monitoring tasks, since too small a detection angle permits loopholes for an unnoticed forced entry. In order to secure a space in front of a wall of a house, the detection angle should amount to 180°, while in the region of a corner of a house, at which two walls of the house meet each other, the detection angle would have to be 270°. At least in the second case, it was previously necessary to work with two PIR movement detectors, since their detection angle does not normally go beyond 180°.

Without aids, the light sensors which are available for the construction of PIR movement sensors have an axissymmetrical detection angle of about 90°. Outside that usable region the sensitivity falls by 3 dB and is thus too small for reliable evaluation. For the purposes of optical amplification, a lens is set in front of the light sensor at the distance of its focal length, which reduces the detection angle by a few degrees of angle. It is only through the use of a correspondingly large number of collecting lenses with their own central axes disposed next to one another that an n-fold duplication of the projection, spreading like a fan, can be produced. In that way, the detection angle of the light sensor is transferred to the whole optical device. Most PIR movement detectors work according to that basic principle.

Various efforts have been made in order to then increase the detection angle starting from the available 90° of the light sensor. Thus, Published European Application No. 0 113 468 B1 describes a device in which an increase of the detection angle is achieved with the aid of inclined mirrors. Whereas in the central region, symmetrical to a surface normal N forming the central axis of the light sensor, the light beams are incident directly on the light sensor while being unreflected, light beams coming from the two side regions are deflected through the mirrors onto the light sensor in such a way that they fall correspondingly more steeply at a relatively small angle to the surface normal N. It is possible to provide a detection angle of about 180° with that device.

Another device which is known from Published European Application No. 0 326 942 A2 is constructed with two light sensors. They are positioned offset relative to each other at such an angle that their two detection angles add up to a total detection angle of about 180°.

Furthermore, from Published European Applications No. 0 219 954 A1 and No. 0 435 120 A 2, further devices are known which are equipped with an additional mirror that reflects light beams coming from below onto the light sensor.

SUMMARY OF THE INVENTION

It is accordingly an object of the invention to provide a device for receiving light beams, which overcomes the hereinafore-mentioned disadvantages of the heretofore-known devices of this general type, which is able to be constructed with simple means and with which a detection angle extending distinctly beyond 180° can be achieved.

With the foregoing and other objects in view there is provided, in accordance with the invention, a device for receiving light beams, especially a PIR movement detector, comprising a housing having at least one window; two light sensors being mutually disposed for defining or obtaining a usable sensor detection angle of the light sensors; first lens segments, preferably constructed as Fresnel lenses, being disposed in the at least one window for focussing horizontally incident light beams onto the light sensors as direct horizontal beams; at least one horizontal reflector being disposed in the vicinity of at least one of the light sensors, for detecting further light beams from a horizontal angular region not covered by the usable detection angle of the light sensors and causing the further light beams to reach at least one of the light sensors as reflected horizontal beams; and the first lens segments surrounding the light sensors having the at least one horizontal reflector in a curve-shape and focussing the horizontal beams being incident outside the usable sensor detection angle.

While known devices, which work either with two light sensors or with a light sensor and mirrors, stay in the range of 180°, it is possible with the device according to the invention to provide detection angles of up to 270° and, if necessary, beyond, in a surprisingly simple way. This is done by a combination of specific features of these devices and in this way it provides a two-sided corner monitoring with only one PIR movement detector, thus omitting one device. In order to achieve a detection angle of 270°, two horizontal reflector detection angles of about 45° must be added to the two sensor detection angles that are each of about 90°. This can be achieved by assigning the two horizontal reflectors to only one light sensor, or by supplementing each of the two light sensors by means of a horizontal reflector.

In accordance with another feature of the invention, the device is constructed symmetrically to a vertical space-dividing plane, a left horizontal reflector is assigned to a left light sensor and a right horizontal reflector is assigned to a right light sensor. In this case, the two light beams impinging on the horizontal reflectors, after their reflection, stay in the half-space from which they come. With this configuration a detection angle of 135° is achieved in each case on both sides of a vertical space-dividing plane, therefore 270° in total.

In accordance with a further feature of the invention, a particularly high sensitivity of the PIR movement detector is achieved in that all reflected horizontal beams experience only one single reflection and in that the angle of incidence with which the reflected light beam is incident on the respective light sensor becomes smaller with reference to a central sensor axis.

In principle it would be possible to offset the two light sensors at an angle of 180° to each other, thus positioning the two virtually back-to-back. In this case, the detection angles of the two horizontal reflectors would meet each other in the region of the vertical space-dividing plane. However, since in general the highest sensitivity is desired just in this region, in accordance with an added feature of the invention, with the aid of the horizontal reflectors, a left horizontal reflector detection angle is joined onto the left sensor detection angle and a right horizontal reflector detection angle is joined onto the right sensor detection angle, and the horizontal total detection angle thus in turn reaches a magnitude of 270°.

In accordance with an additional feature of the invention, in order to be able to also detect horizontally incident light beams which have a vertical component, the lens segments are constructed in such a way that a plurality of principal focusing axes are produced for the horizontal light beams and the reflection is carried out through focus-specific reflector segments of the horizontal reflectors. Each lense segment has its own principal focussing axis and these focussing axes do not coincide at one point, but instead they impinge on focussing-specific reflector segments of the horizontal reflectors. In other words, the horizontal reflectors R1 and R2 are not planar mirrors, but they are formed of individual segments.

In accordance with yet another feature of the invention, the individual reflector segments are flat or approximately flat.

In accordance with yet a further feature of the invention, the horizontal reflectors are fixed on a holder which serves simultaneously as a positioner for the two light sensors.

In accordance with yet an added feature of the invention, the processing of the electrical output signals of the two light sensors is carried out separately. This makes disturbances and technical faults of the device more easily detectable.

In accordance with yet an additional feature of the invention, in the case of the 270° construction, lateral flaring of the curve formed by the lens segments is avoided by ensuring that the curve runs out to its two ends in a straight line and the lens segments lying in the region of the horizontal reflector detection angles, which segments form the part running straight out, are correspondingly aligned with their central axis on the respective associated light sensor.

In accordance with again another feature of the invention, a quite significant improvement of the properties of the PIR movement detector are achieved by providing a further window on the lower surface or underside of the housing, in which preferably two lens segments are disposed, and by assigning a left vertical reflector to the left light sensor and a right vertical reflector to the right light sensor in such a way that incident light beams from below within a first vertical reflector detection angle and within a second vertical reflector detection angle are reflected onto the two light sensors. In this way, not only are the far-distance and middle-distance region around the PIR movement detector detected by the latter, but also the near region, so that protection is also achieved against creeping underneath.

In accordance with a concomitant feature of the invention, analogous to the construction of the part of the PIR movement detector detecting the horizontal radiation, the part detecting the vertical radiation is constructed correspondingly symmetrically to the vertical space-dividing plane, with the light beams impinging on the two vertical reflectors staying in the half-space from which they come, after their reflection.

Other features which are considered as characteristic for the invention are set forth in the appended claims.

Although the invention is illustrated and described herein as embodied in a device for receiving light beams, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
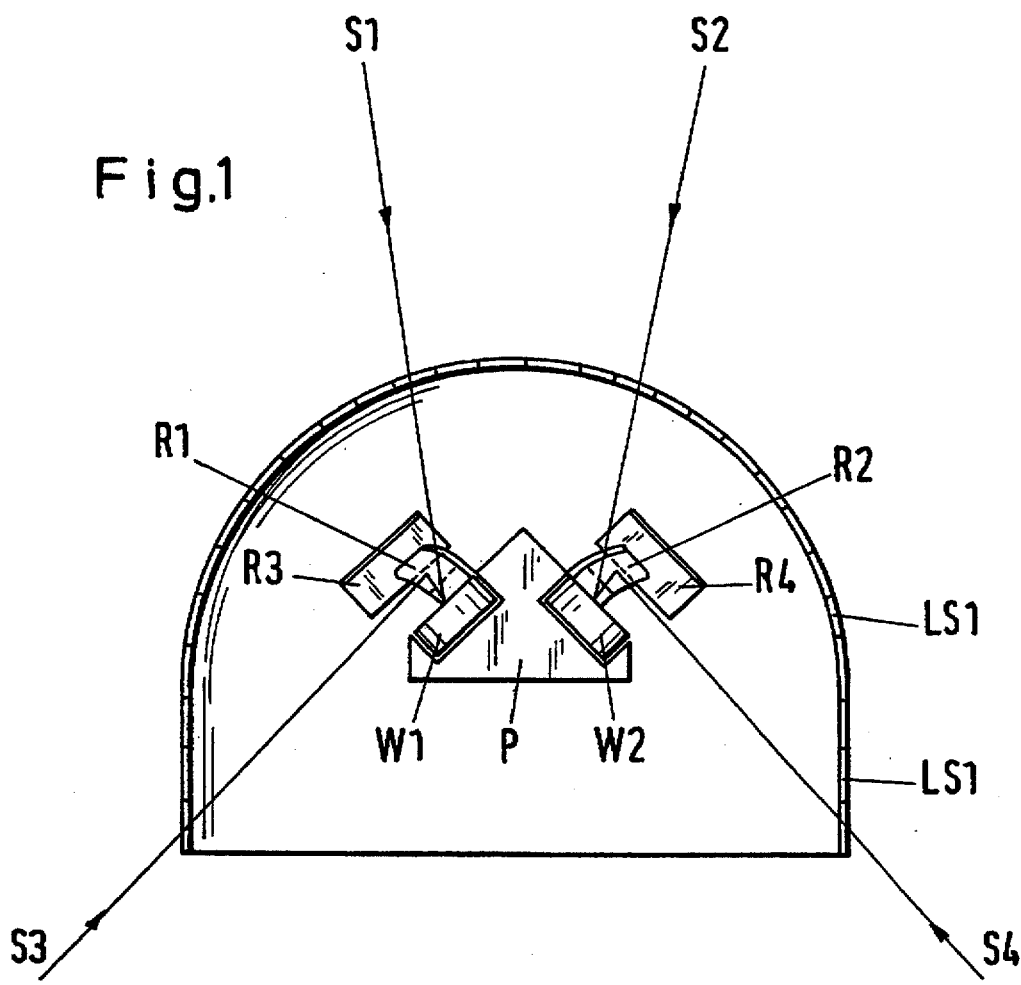
FIG. 1 is a diagrammatic, top-plan view of an optical part of a PIR movement detector, with a course of horizontal light beams which are directly incident and reflected.
Figure 2:
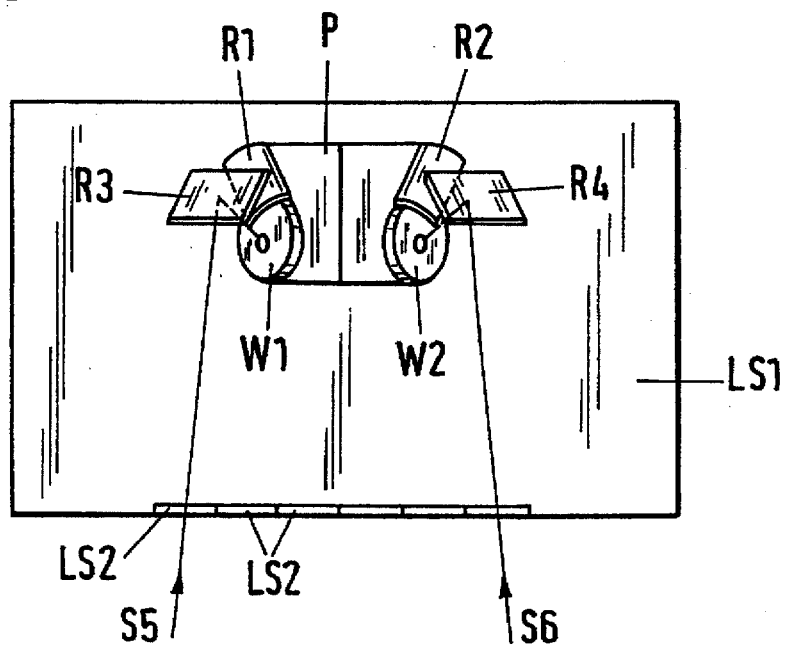
FIG. 2 is a side-elevational view of the representation according to FIG. 1, with a course of reflected vertical light beams.

Referring now to the figures of the drawing in detail and first, particularly, to FIGS. 1 and 2 thereof, there is seen a PIR movement detector which has a left light sensor W1 and a right light sensor W2, that are disposed offset at an angle of 90° relative to each other. Assigned to the left light sensor W1 are a left horizontal reflector R1 and a left vertical reflector R3 and assigned to the right light sensor W2 are a right horizontal reflector R2 and a right vertical reflector R4. The optical elements mentioned above are positioned and fastened on a positioner P in such a way that a specific detection angle is covered in each case with their aid.

The configuration described above is surrounded by a plurality of individual first lens segments LS1 that are preferably constructed as Fresnel lenses and are disposed in a row next to one another in a curve-shape in at least one window of a housing. The curve covers about 270° and ends of the curve run straight out on both sides.

Figure 3:
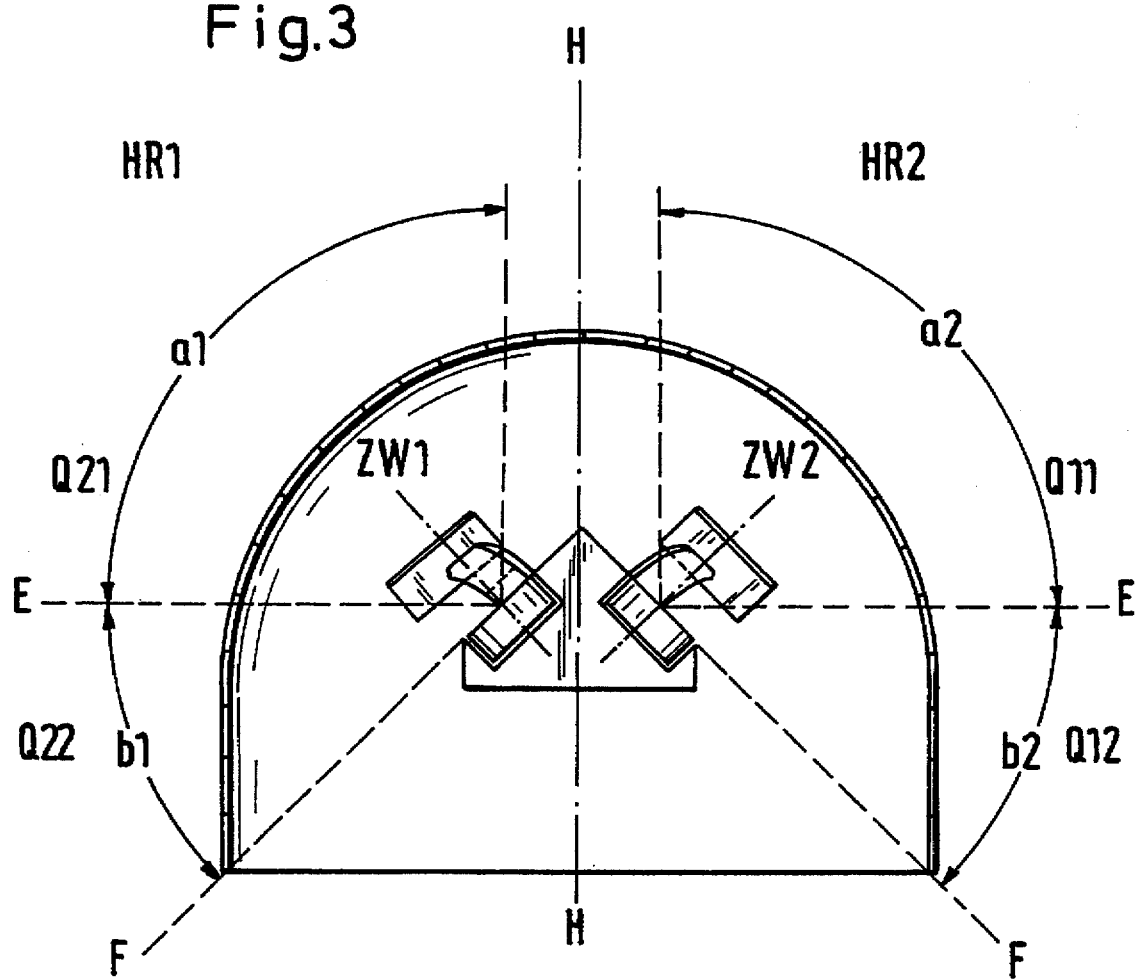
FIG. 3 is a view of the representation according to FIG. 1, with detection angles of individual optical elements.

As can also be seen from FIGS. 2 and 3, the device has a construction in which the optical elements are disposed symmetrically relative to a vertical space-dividing plane H between a left half-space HR1 and a right half-space HR2. Correspondingly, symmetrical detection regions also result on both sides of the vertical space-dividing plane H. Proceeding from the left light sensor W1, it is seen that a left sensor detection angle a1 of about 90° lies in a first left quadrant Q21 between the vertical space-dividing plane H and a first vertical plane E, in which horizontally incident light beams are detected. This detection region is widened through the use of the left horizontal reflector R1 by a left horizontal reflector detection angle b1 joining onto a second vertical plane F and lying in a second left quadrant Q22.

The same conditions are provided in a right half-space HR2 having first and second right quadrants Q11, Q12 and angles a2 and b2 on the right side of the vertical space-dividing plane H, as in the left half-space HR1 having the first and second left quadrants Q21, Q22, but with mirror inversion. Therefore, no repetition of the explanation of this fundamental construction is necessary.

Horizontal beams S1, S2 which are directly incident in the region of the left sensor detection angle a1 and of the right sensor detection angle a2 reach the light sensors W1, W2 assigned to them directly and unreflected, while reflected horizontal beams S3, S4 that are incident in the region of the left horizontal reflector detection angle b1 and of the right horizontal reflector detection angle b2 only reach the light sensors W1, W2 assigned to them by means of a deflection through the horizontal reflectors R1, R2. The reflected horizontal beams S3, S4, which are initially incident very flatly, are incident considerably more steeply after their deflection and are thus at an acute angle relative to central sensor axes ZW1, ZW2 of the respective light sensors W1, W2.

Figure 4:
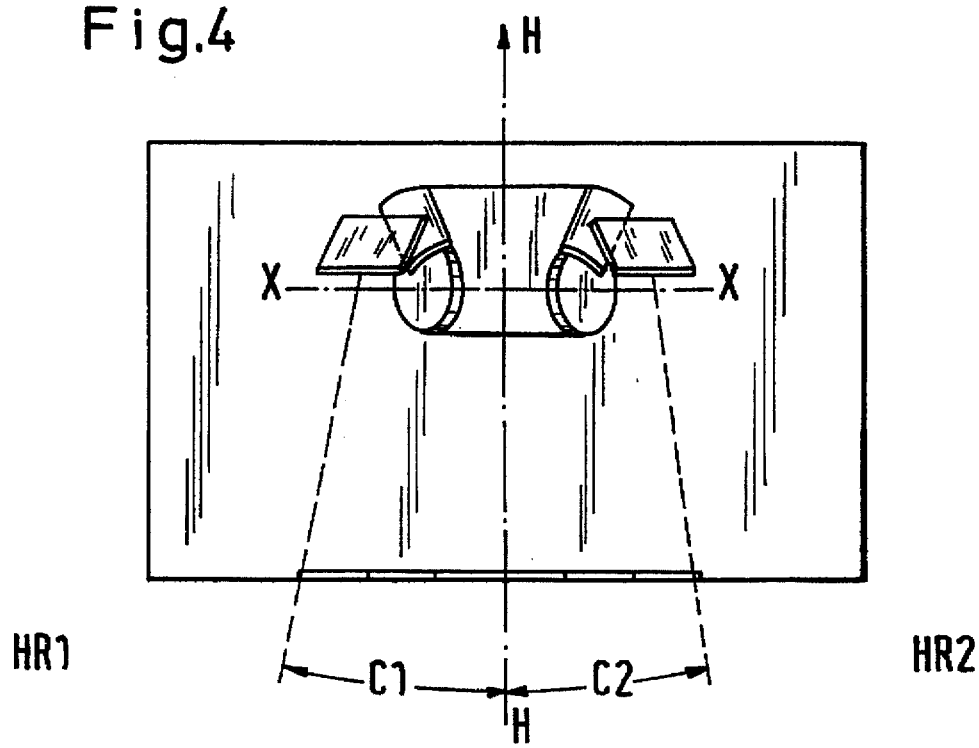
FIG. 4 is a view of the representation according to FIG. 2, with detection angles of vertical reflectors.

FIGS. 2 and 4 illustrate how vertical reflector detection angles C1, C2 can be realized additionally to the horizontal detection angles, with the aid of a left vertical reflector R3 and a right vertical reflector R4. For this purpose, a bottom region of the PIR movement detector is provided with second lens segments LS2, through which reflected vertical beams S5, S6 coming from below reach the associated light sensors W1, W2, after a single deflection at the vertical reflectors R3, R4.

However, since the detection angles are spatial angles having an extent which can only be represented in one plane in each case, further fourth and fifth detection angles extending in the direction of the vertical space-dividing plane H are associated with the second and third vertical reflector detection angles C1, C2. However, the fourth and fifth detection angles are not shown, since they are self-evident.

As can also easily be seen from the different figures, the individual reflectors R1 to R4 are each disposed in such a way that the incident light beams S3 to S6 stay in the half-space HR1, HR2 from which they come, after their single reflection.

We claim:

1. A device for receiving light beams, comprising:

a housing having at least one window;

left and right light sensors being mutually disposed for defining a usable sensor detection angle of said light sensors;

lens segments disposed in said at least one window for focussing horizontally incident light beams onto said light sensors as direct horizontal beams;

a left horizontal reflector disposed in the vicinity of and assigned to said left light sensor, and a right horizontal reflector disposed in the vicinity of and assigned to said right light sensor, said reflectors detecting further light beams from a horizontal angular region not covered by the usable detection angle of said light sensors and causing the further light beams to reach at least one of said light sensors as reflected horizontal beams; and said lens segments surrounding said light sensors and said horizontal reflectors in a curve-shape and focussing the horizontal beams being incident outside the usable sensor detection angle; said first and second horizontal reflectors behind disposed symmetrically to a vertical space-dividing plane defining half-spaces, for keeping the light beams impinging on said horizontal reflectors in the space-half from which they come, after reflection.

2. The device according to claim 1, wherein said housing is a passive infrared movement detector housing.

3. The device according to claim 1, wherein said lens segments are Fresnel lenses.

4. The device according to claim 1, wherein said light sensors define a central sensor axis, and all of the reflected horizontal beams experience only one single reflection in which an angle of incidence on a respective one of said light sensors relative to the central sensor axis becomes smaller.

5. The device according to claim 1, wherein said light sensors define respective left and right sensor detection angles, and said horizontal reflectors join a left horizontal reflector detection angle on to the left sensor detection angle and join a right horizontal reflector detection angle on to the right sensor detection angle, defining a total horizontal detection angle reaching 270°.

6. The device according to claim 1, wherein said left and right horizontal reflectors have focus-specific reflector segments, and said lens segments produce a plurality of principal focusing axes for the horizontal light beams and carry out reflection through said focus-specific reflector segments.

7. The device according to claim 6, wherein said individual reflector segments are at least approximately flat.

8. The device according to claim 1, including a holder serving simultaneously as a positioner for said light sensors, said at least one horizontal reflector including left and right horizontal reflectors being fixed on said holder.

9. The device according to claim 1, wherein said at least one horizontal reflector includes two horizontal reflectors each being associated with a respective one of said light sensors and having horizontal reflector detection angles, said curve-shape formed by said lens segments merging into parts running straight out to two ends.

10. The device according to claim 1, including a further window on a lower surface of said housing, at least one further lens segment disposed in said further window, said light sensors being left and right light sensors, and a left vertical reflector assigned to said left light sensor and a right vertical reflector assigned to said right light sensor for reflecting incident light beams from below within a first vertical reflector detection angle and within a second vertical reflector detection angle on to said light sensors.

11. The device according to claim 10, wherein said at least one further lens segment is two further lens segments.

12. The device according to claim 10, wherein said housing is symmetrical to a vertical space-dividing plane defining half-spaces, and light beams impinging on said two vertical reflectors stay in the half-space from which they come, after reflection.

13. A device for receiving light beams, comprising:

a housing having at least one window;

two light sensors being mutually disposed for defining a usable sensor detection angle of said light sensors of approximately 180°;

lens segments being disposed in said at least one window for focussing horizontally incident light beams onto said light sensors as direct horizontal beams;

at least one horizontal reflector being disposed in the vicinity of at least one of said light sensors, for detecting further light beams from a horizontal angular region not covered by the usable detection angle of said light sensors and causing the further light beams to reach at least one of said light sensors as reflected horizontal beams; and said lens segments surrounding said light sensors and said at least one horizontal reflector in a curve-shape and focussing the horizontal beams being incident outside the usable sensor detection angle.

* * * * *